United States Patent
Kessler et al.

(10) Patent No.: US 12,187,124 B2
(45) Date of Patent: Jan. 7, 2025

(54) DISPLAY DEVICE HAVING A COVER BODY FORMING A PLURALITY OF DISPLAY AREAS TO BE BACKLIT AND MEETING DIFFERENT OPTICAL REQUIREMENTS, ASSOCIATED USE AND ASSOCIATED PRODUCTION METHOD

(71) Applicant: Preh GmbH, Bad Neustadt a.d. Saale (DE)

(72) Inventors: Andre Kessler, Poppenlauer (DE); Jonas Sterzinger, Heustreu (DE); Andreas Saal, Poppenlauer (DE); Dominik Endres, Bischofsheim (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 0 days.

(21) Appl. No.: 18/661,127

(22) Filed: May 10, 2024

(65) Prior Publication Data

US 2024/0375514 A1 Nov. 14, 2024

(30) Foreign Application Priority Data

May 12, 2023 (DE) .......................... 102023112666.0

(51) Int. Cl.
*B60K 35/22* (2024.01)

(52) U.S. Cl.
CPC .......... *B60K 35/22* (2024.01); *B60K 2360/28* (2024.01); *B60K 2360/336* (2024.01); *B60K 2360/34* (2024.01); *B60K 2360/96* (2024.01)

(58) Field of Classification Search
CPC .......................... B60K 35/22; B60K 2360/336
See application file for complete search history.

(56) References Cited

U.S. PATENT DOCUMENTS

| 12,049,996 | B2 * | 7/2024 | Sato | ........................ F21S 43/14 |
| 2015/0185546 | A1 | 7/2015 | Lee et al. | |
| 2019/0310486 | A1 * | 10/2019 | Ferri | ...................... B60K 35/00 |

FOREIGN PATENT DOCUMENTS

| DE | 112021006136 | 9/2023 |
| JP | 2011203605 A | 10/2011 |

OTHER PUBLICATIONS

German Office Action for DE 10 2023 112 666.0, dated Dec. 18, 2023. German Patent and Trade Mark Office, Munich, Germany.

* cited by examiner

*Primary Examiner* — Thomas M Sember
(74) *Attorney, Agent, or Firm* — M&B IP Analysts, LLC

(57) ABSTRACT

A display device including a cover body with a surface facing an observer and a back face facing away from the observer, the cover body has at least two translucent to transparent cover body components which each form a portion of the surface and a portion of the back face; at least one opaque masking layer on the surface facing the observer and which the portion of the surface of the less light transmissive cover body component delimits a first display area to be backlit and the portion of the surface of the more light transmissive cover body component delimits a second display area to be backlit; a support having a plurality of light sources arranged on the side of the cover body facing away from the observer to backlight the display areas; and a frame integrally bonded to the cover body to secure the cover body on the support.

15 Claims, 2 Drawing Sheets

DISPLAY DEVICE HAVING A COVER BODY FORMING A PLURALITY OF DISPLAY AREAS TO BE BACKLIT AND MEETING DIFFERENT OPTICAL REQUIREMENTS, ASSOCIATED USE AND ASSOCIATED PRODUCTION METHOD

The present disclosure relates to a display device having a plurality of display areas, with the plurality of display areas being provided by a common cover body and with the cover body varying in terms of its transillumination properties in order to meet the optical requirements of the display areas. Display devices, especially in motor vehicles, are regularly overloaded with display areas to be backlit as it is necessary to visualize various switching functionalities and/or switching states. So as not to overload the driver with information, it is conventional practice to mask such display areas if all that is needed is the optical signalling of the activation of one specific switching state from many, for example the deactivation of the passenger airbag. By contrast, other, permanently backlit display areas are regularly provided, for example because the switching state is visualized by a colour change of the light source or serving the purpose of facilitating the retrieval and orientation for the observer, for example as is the case for a display device which is part of an operating element for a manual operation and for bringing about a switching state change by said operation. If these different display areas are arranged next to one another and on a common cover body, then the "optical" insulation of the display area that should not be apparent when the light source is switched off presents the designer with great challenges. This is usually achieved by a multicoating on the back face of the cover body facing away from the observer, albeit under the accompaniment of the disadvantage that the structure becomes more complicated, especially the fastening of the cover body to a support regularly adversely affects the optical properties of the display device.

Against this background, it is the object of the present disclosure to provide a display device with a structurally simplified production and with a plurality of display areas provided by a common cover body, with the display areas meeting different optical requirements. This object is achieved by an operating element or visual element from claim 1. A corresponding use and a corresponding production method each are the subject matter of an alternative independent claim. Advantageous configurations are the subject matter of the respective dependent claims. Attention is drawn to the fact that the features listed individually in the patent claims can be combined with one another in any technologically expedient manner and reveal further configurations of the present disclosure. Additional characterization and specification of the disclosed embodiments are provided by the description, especially in conjunction with the figures.

The present disclosure relates to a display device comprising a cover body with a surface facing an observer and a back face facing away from the observer. According to the present disclosure, the cover body is formed by at least two, integrally bonded, translucent to transparent cover body components which each form a portion of the surface and each form a portion of the back face under the formation of a common interface. In this case, the interface extends between the surface and the back face. According to the present disclosure, the two cover body components differ in terms of their light transmittance. For example, the cover body is produced as a formed body in a common forming tool by way of a two-component injection moulding method. For example, each cover body component is formed from a thermoplastic. For example, the different light transmittances arise from forming and/or the choice of material for the respective cover body component.

According to the present disclosure, provision is made for at least one opaque masking layer which is applied to the surface of the cover body facing the observer and which, in the portion of the surface formed by the less light transmissive cover body component, delimits a first display area to be backlit and which, in the portion of the surface formed by the more light transmissive cover body component, delimits a second display area to be backlit. For example, the first and second display areas are designed such that they reproduce, for example in a positive or negative representation, a symbol, a pictogram, a character and/or a sequence of characters.

According to the present disclosure, the display device therefore further comprises a support having a plurality of light sources arranged on the side of the cover body facing away from the observer and serving to backlight the first display area or second display area.

The different light transmittances of the cover body components are set for example by the choice of material, preferably by the addition of different amounts of colloidal carbon particles, also referred to as carbon black or industrial soot, to the material, for example a thermoplastic, which forms the respective cover body component. The lower light transmittance of the first cover body component prevents the optical appearance of the first display area when the light source is switched off; this is commonly referred to as the "vanishing effect" and lends itself to those display situations where the observer should only be informed sporadically about certain switching states, for example as in the case of faults in the operating sequence of the motor vehicle provided with the display device, or as in similar cases.

For example, at least in the region of the second display area the cover body component which forms the second display area and is also referred to below as second cover body component has a thinning, i.e. a region of reduced thickness, vis-à-vis the residual remainder of the second cover body component or vis-à-vis the cover body component which forms the first display area and is also referred to as first cover body component, in order to achieve the higher light transmittance of the second cover body component in comparison with the first cover body component.

By preference, the maximum thickness of the masking layer does not exceed 8 μm. For example, the masking layer is a layer of lacquer. For example, the masking layer is applied all over the surface of the cover body, and the first and second display areas are subsequently exposed, for example by an ablation such as laser ablation.

According to the present disclosure there also is a frame which is made of an opaque material, integrally bonded to the cover body and serves to secure the cover body on the support via the frame. For example, the frame is secured to the support by way of a connection means which establishes a latching connection. For example, the latter comprise a latching recess and a latching lug engaging in the latching recess, or the like. According to the present disclosure, the frame extends at least in part along the interface in order to form a light barrier between the first display area and the second display area. For example, the frame extends at least in part along a line on the back face describing the course of the interface or along a line offset in parallel to the course of the interface. Thus, the frame ensures that there is no unwanted "crosstalk", i.e. unwanted light irradiation by an adjacent light source not really assigned to the respective display area for backlighting purposes. The configuration according to the present disclosure allows a generic display device to be realized comparatively easily while maintaining a significant optical appeal of the surface of its cover body at the same time.

According to a preferred configuration, a translucent, optical obfuscation layer is also applied to the masking layer and furthermore covers the first display area. For example, this relates to a translucent layer of lacquer. As a result of the obfuscation layer there is better optical lamination of the first display area in the case of an inactive associated light source. By preference, the second display area is not covered by the obfuscation layer. For example, this is achieved by ablating, for example by laser ablation, an obfuscation layer applied all over the surface of the cover body. For example, the obfuscation layer has a light transmittance which corresponds to or is less than that of the cover body component forming the first display area but is greater than that of the masking layer.

By preference, the maximum thickness of the obfuscation layer is of the order of 35 to 50 µm.

By preference, a transparent, outer capping layer, which covers the first display area and second display area, is also applied to the surface of the cover body. For example, the capping layer has a maximum thickness greater than that of the obfuscation layer. For example, the light transmittance of the capping layer is greater than that of the cover body component forming the second display area.

To provide better optical coupling and hence more effective backlighting of the respective display area, a plurality of light guides are provided, each extending between a portion of the back face and one of the light sources.

The present disclosure also relates to the use of the display device as per one of the embodiments described above in a motor vehicle, in particular in the case of a sporadic activation of the light source associated with the backlighting of the first display area.

The present disclosure also relates to a method for producing a display device including the steps set forth below. In a creation step, a cover body is produced in a multicomponent injection moulding method, said cover body following the intended arrangement thereof forming a surface facing the observer and a back face facing away from the observer such that the cover body is formed by at least two, integrally bonded, translucent to transparent cover body components which each form a portion of the surface and each form a portion of the back face under the formation of a common interface that extends between the surface and the back face. According to the present disclosure, the two cover body components differ in terms of their light transmittance in this case. For example, the different light transmittances arise from forming and/or the choice of material for the respective cover body component. For example, at least in the region of the second display area the second cover body component has a thinning, i.e. a region of reduced thickness, vis-à-vis the residual remainder of the second cover body component.

In a simultaneous or subsequent step, there is integral bonding to a frame made of an opaque material, with the frame extending at least in part along the interface in order to form a light barrier between the first display area and the second display area.

In a step following at least the creation step, the cover body is coated under the formation of an opaque masking layer applied to the surface facing the observer. By preference, the surface is coated all over. In a subsequent step there is a partial removal of the masking layer such that the latter, in the portion of the surface formed by the less light transmissive cover body component, delimits a first display area to be backlit and, in the portion of the surface formed by the more light transmissive cover body component, delimits a second display area to be backlit.

In a subsequent assembly step, the frame is secured to a support, with a plurality of light sources arranged on the side of the cover body facing away from the observer and serving to backlight the first display area and second display area being provided on the support. Thus, the frame ensures that there is no unwanted "crosstalk", i.e. unwanted light irradiation by an adjacent light source not really assigned to the respective display area for backlighting purposes. The method according to the present disclosure allows a generic display device to be realized comparatively easily while maintaining a significant optical appeal of the surface of its cover body at the same time.

According to preferred configuration of the method, provision should be made for an intermediate step, to be performed at a suitable time, within the scope of which the cover body is coated such that a translucent, optical obfuscation layer is also applied to the masking layer and furthermore covers the first display area. For example, this relates to a translucent layer of lacquer. As a result of the obfuscation layer there is better optical lamination of the first display area in the case of an inactive associated light source. By preference, the second display area is not covered by the obfuscation layer. For example, this is achieved by ablating, for example by laser ablation, an obfuscation layer applied all over the surface of the cover body. For example, the obfuscation layer has a light transmittance which corresponds to or is less than that of the cover body component forming the first display area but is greater than that of the masking layer.

By preference, the maximum thickness of the obfuscation layer is of the order of 35 to 50 µm.

According to a preferred configuration of the method a coating step is provided, within the scope of which the cover body is coated such that a transparent, outer capping layer, which covers the first display area and second display area, is also being applied to the surface of the cover body. For example, the capping layer has a maximum thickness greater than that of the obfuscation layer. For example, the light transmittance of the capping layer is a greater than that of the cover body component forming the second display area.

To provide better optical coupling and hence more effective backlighting of the respective display area, an arrangement step is preferably provided, within the scope of which a plurality of light guides are arranged, each extending between a portion of the back face and one of the light sources.

The various disclosed embodiments and the technical field are explained in detail below on the basis of the figures. Attention is drawn to the fact that the figures show a particularly preferred embodiment variant of the disclosed embodiments, the latter however not being restricted thereto. Schematically:

FIG. 1a shows a schematic sectional view of an embodiment of the display device 1 according to an embodiment;

FIG. 1b shows a detailed view associated with FIG. 1a, especially of the second cover body component 2b of the display device 1 from FIG. 1;

FIG. 1c shows a detailed view associated with FIG. 1a, especially of the first cover body component 2b of the display device 1 from FIG. 1;

FIG. 1d shows a detailed view associated with FIG. 1a;

FIG. 1d' shows a detailed view of an alternative embodiment to the embodiment shown in FIG. 1a.

Figure 1:
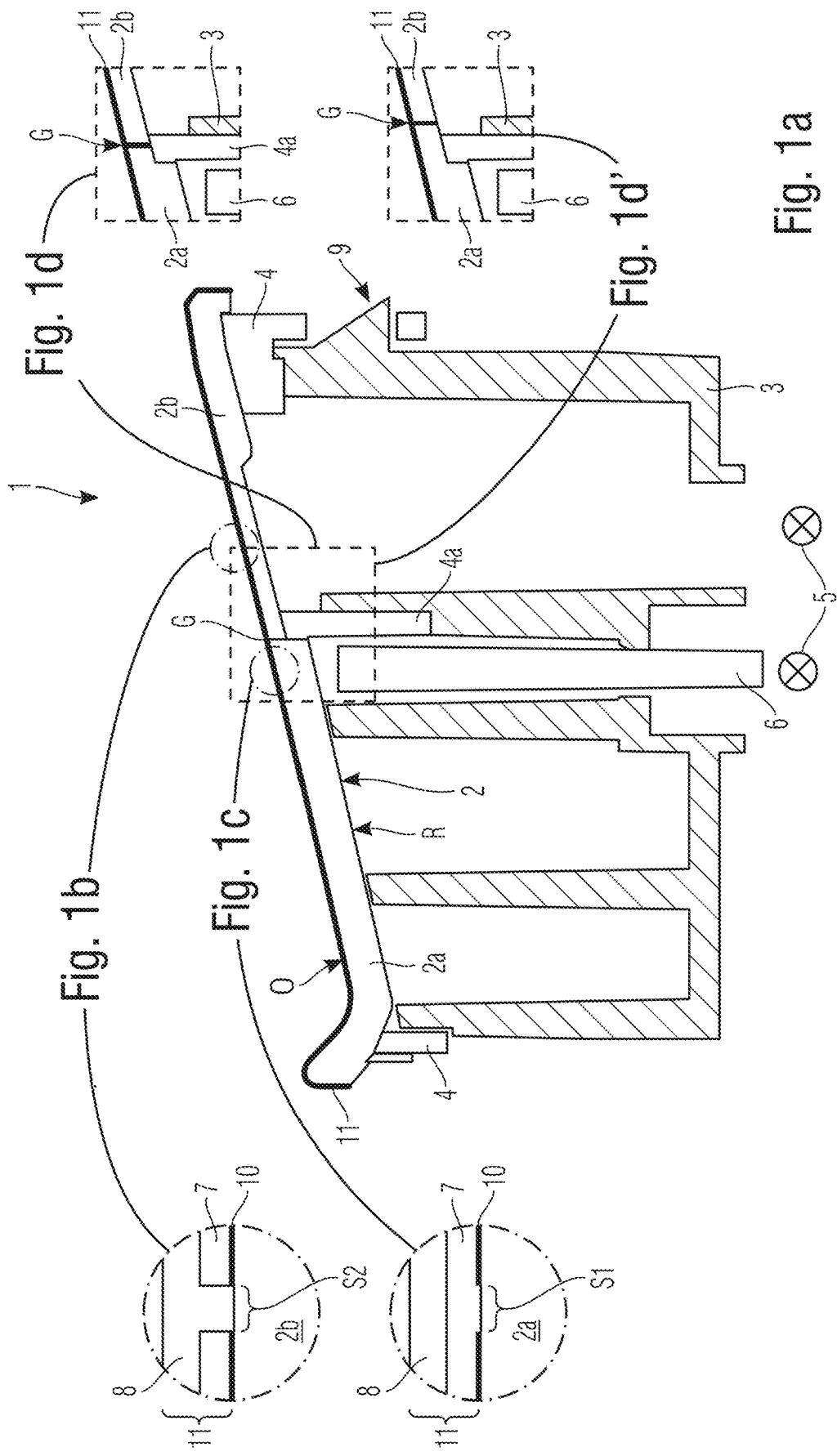
Figure 2:
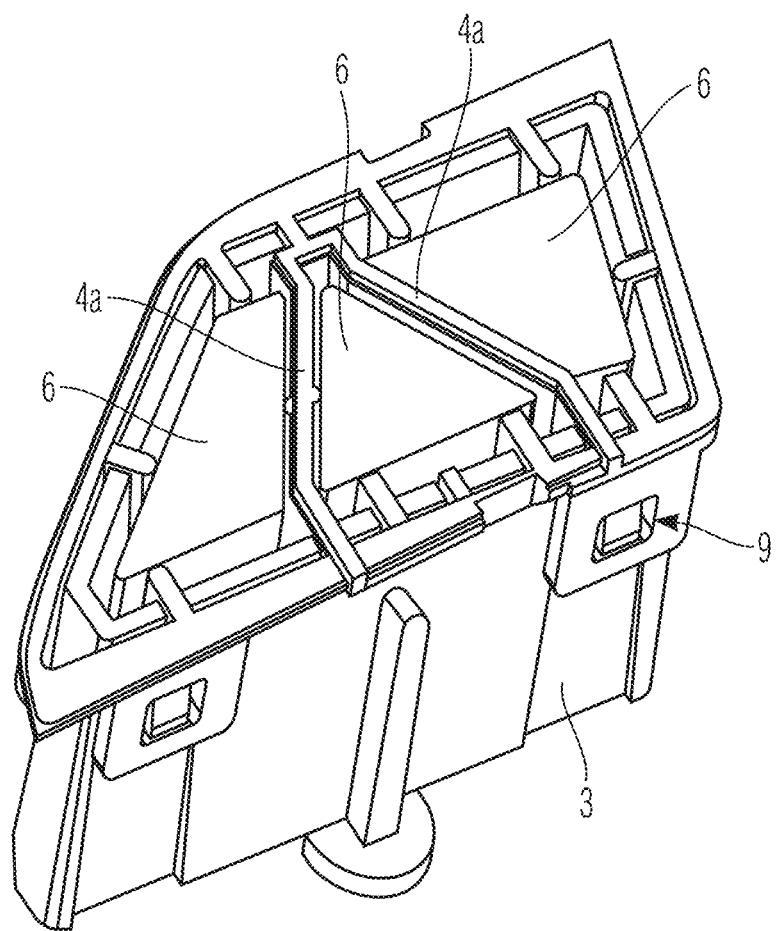

FIG. 2 shows a perspective plan view of the "substructure" of the cover body 2 of the embodiment shown in FIG. 1.

As shown in FIG. 1a, the disclosed embodiment relates to a display device 1, especially for a motor vehicle. The display device may serve exclusively for the display of functional states of a vehicle component; however, it may also be part of a piece of operating equipment, for example in which additional provision is made for a contact detection device for detecting a touch input or in which portions of the display device are designed to be displaceable in order to undertake a manual actuation and provision is made for an associated actuation detection device for detecting the actuation input. The display device 1 comprises a cover body 2 with a surface O facing an observer and a back face R facing away from the observer. In this case, the cover body 2 is formed by two or more, integrally bonded, translucent to transparent cover body components 2a, 2b which each form a portion of the surface O and each form a portion of the back face R under the formation of a common interface G. In this case, the interface G extends between the surface O and the back face R. Two of the cover body components 2a, 2b differ in terms of their light transmittance. In the embodiment shown, the cover body 2 is produced as a formed body in a common forming tool by way of a two-component injection moulding method. The cover body components 2a, 2b are each formed from a thermoplastic such as polyethylene (PE), polycarbonate (PC), polystyrene (PS), polyvinyl chloride (PVC), polyamide (PA), acrylonitrile butadiene styrene (ABS) or polymethylmethacrylate (PMMA).

A layer structure 11 is applied to the surface O of the cover body 2 facing the observer, said layer structure comprising a lowermost, opaque masking layer 10 which is applied directly to the cover body 2, which, in the portion of the surface O formed by the less light transmissive, first cover body component 2a, delimits a first display area S1 to be backlit and which, in the portion of the surface O formed by the more light transmissive, second cover body component 2b, delimits a second display area S2 to be backlit. For example, the first display area S1 and second display area S2 are designed such that they reproduce, for example in a positive or negative representation, a symbol, a pictogram, a character and/or a sequence of characters. In this case, the maximum thickness of the masking layer 10 does not exceed 8 μm. For example, the masking layer 10 is applied all over the surface O of the cover body 2, and the first display area S1 and second display area S2 are subsequently exposed, for example by an ablation such as laser ablation. The display device 1 also comprises a support 3 having a plurality of light sources 5 arranged on the side of the cover body 2 facing away from the observer and serving to backlight the first display area S1 or second display area S2. To provide better optical coupling and hence more effective backlighting of the respective display area S1, S2, a plurality of light guides 6 are provided, each extending between a portion of the back face R and one of the light sources 5; this can also be identified in FIG. 2.

In the embodiment shown, the different light transmittances arise from forming and the choice of material for the respective cover body component 2a, 2b. For example, at least in the region of the second display area S2 the second cover body component 2b which forms the second display area S2 has a thinning, i.e. a region of reduced thickness, vis-à-vis the residual remainder of the second cover body component 2b, at least vis-à-vis the first cover body component 2a which forms the first display area S1. The different light transmittances are also set by the choice of material, in this case by the addition of different amounts of colloidal carbon particles, also referred to as carbon black or industrial soot, to the material, in this case the thermoplastic, which forms the respective cover body component 2a, 2b.

The lower light transmittance of the first cover body component 2a prevents the optical appearance of the first display area S1 when the light source 5 is switched off; this is commonly referred to as the "vanishing effect" and lends itself to those display situations where the observer should only be informed sporadically about certain switching states, for example as in the case of faults in the operating sequence of the motor vehicle provided with the display device, or as in similar cases.

To make this "vanishing effect" even more pronounced from an optical point of view, a translucent optical obfuscation layer 7, which belongs to the layer structure 11, is applied to the masking layer 10 and furthermore covers the first display area S1 but remains clear of the second display area S2, as evident from FIGS. 1b and 1c. For example, this is achieved by ablating, for example by laser ablation, an obfuscation layer 7 applied all over the surface O of the cover body 2. As a result of the obfuscation layer 7 there is better optical lamination of the first display area S1 in the case of an inactive associated light source 5. For example, the obfuscation layer 7 has a light transmittance which corresponds to or is less than that of the first cover body component 2a but is greater than that of the masking layer 10.

Moreover, a transparent, outer capping layer 8, which is part of the layer structure 11 and covers the first display area S1 and second display area S2, is also applied to the surface O of the cover body 2. For example, the capping layer 9 has a maximum thickness greater than that of the obfuscation layer 7. The light transmittance of the capping layer 8 is greater than that of the second cover body component 2b.

As shown in FIG. 1a, a frame 4 is provided, which is made of an opaque material, integrally bonded to the cover body 2 and serves to secure the cover body 2 on the support 3 via the frame 4. For example, the frame 4 and the cover body 2 have been welded to one another by means of ultrasound. In this case, the frame 4 is secured to the support 3 by way of connecting means 9 that establish a latching connection. For example, the latter comprise a latching recess and a latching lug engaging in the latching recess, or the like. As shown in the detailed views of FIGS. 1d and 1d', the frame 4 extends at least in part along the interface G in order to form a light barrier 4a between the first display area S1 and the second display area S2. According to the embodiment in FIG. 1d, the frame 4 extends at least in part along a line on the back face R describing the course of the interface G or, like in the alternative embodiment of FIG. 1d', said frame extends along a line offset in parallel to the course of the interface G. Thus, the frame 4, in particular the light barrier 4a thereof, ensures that there is no unwanted "crosstalk", i.e. unwanted light irradiation by an adjacent light source 5 not really assigned to the respective display area S1, S2 for backlighting purposes.

What is claimed is:

1. A display device, comprising:
   a cover body which forms a surface (O) facing an observer and a back face (R) facing away from the observer, wherein the cover body is formed by at least two, integrally bonded, translucent to transparent cover body components which each of the at least two cover body components form a portion of the surface (O) and a portion of the back face (R) under a formation of a common interface (G) that extends between the surface (O) and the back face (R), and wherein the at least two cover body components have different light transmittances;

at least one opaque masking layer which is applied to the surface (O) facing the observer and which, in the portion of the surface (O) formed by a less light transmissive cover body component (2a), delimits a first display area (S1) to be backlit, and wherein the portion of the surface (O) formed by a more light transmissive cover body component (2b), delimits a second display area (S2) to be backlit;

a support having a plurality of light sources arranged on a side of the cover body facing away from the observer, wherein the support is adapted to backlight the first display area (S1) or second display area (S2);

a frame made of an opaque material, integrally bonded to the cover body and adapted to secure the cover body on the support via the frame, wherein the frame extends at least in part along the common interface (G) in order to form a light barrier (4a) between the first display area (S1) and the second display area (S2).

2. The display device according to claim 1, wherein a translucent, optical obfuscation layer is applied to the at least one masking layer and is adapted to cover the first display area (S1).

3. The display device according to claim 2, wherein a maximum thickness of the optical obfuscation layer is in a range of 35 to 50 μm.

4. The display device according to claim 2, further comprising: a transparent, outer capping layer, which covers the first display area (S1) and the second display area (S2), wherein the outer capping layer is also applied to the surface (O) of the cover body.

5. The display device according to claim 2, further comprising: a plurality of light guides, wherein each of the plurality of the light guides extend between a portion of the back face (R) and one of the plurality of light sources.

6. The display device according to claim 1, further comprising: a transparent, outer capping layer, which covers the first display area (S1) and the second display area (S2), wherein the outer capping layer is also applied to the surface (O) of the cover body.

7. The display device according to claim 1, further comprising: a plurality of light guides, wherein each of the plurality of the light guides extend between a portion of the back face (R) and one of the plurality of light sources.

8. The display device according to claim 1, wherein a maximum thickness of the at least one masking layer does not exceed 8 μm.

9. The display device according to claim 1, wherein the display device is used in a motor vehicle for a sporadic activation of the plurality of light source associated with the backlighting of the first display area.

10. A method for producing a display device, comprising the following steps:

creating a cover body in a multicomponent injection moulding method, said cover body arranged to form a surface (O) facing an observer and a back face (R) facing away from the observer such that the cover body is formed by at least two, integrally bonded, translucent to transparent cover body components which each of the at least two cover body components form a portion of the surface (0) and a portion of the back face (R) under a formation of a common interface (G) that extends between the surface (O) and the back face (R) and wherein the at least two cover body components have different light transmittances;

integrally bonding the cover body to a frame made of an opaque material, wherein the frame extends at least in part along the common interface (G) in order to form a light barrier (4a) between a first display area (S1) and a second display area (S2);

coating the cover body under the formation of an opaque masking layer applied to the surface (O) facing the observer;

partially removing the masking layer such that the masking layer, in the portion of the surface (O) formed by a less light transmissive cover body component (2a), delimits a first display area (S1) to be backlit and, in the portion of the surface (O) formed by a more light transmissive cover body component (2b), delimits a second display area (S2) to be backlit;

performing an assembly by securing the frame to a support, wherein a plurality of light sources arranged on a side of the cover body facing away from the observer and adapted to backlight the first display area (S1) or second display area (S2) being provided on the support.

11. The method according to claim 10, further comprising the following step: coating the cover body, with a translucent, optical obfuscation layer, wherein the optical obfuscation layer is applied onto the masking layer and furthermore adapted to cover the first display area (S1).

12. The method according to claim 11, wherein a maximum thickness of the obfuscation layer is in a range of 35 to 50 μm.

13. A method according to claim 10, further comprising the following step: coating the cover body, with a transparent, outer capping layer, which covers the first display area (S1) and second display area (S2), wherein the outer capping layer is also applied onto the surface (O) of the cover body.

14. The method according to claim 10, further comprising: arranging a plurality of light guides which each extend between a portion of the back face (R) and one of the plurality of light sources.

15. The method according to claim 10, wherein a maximum thickness of the masking layer does not exceed 8 μm.

* * * * *